Figure 1:
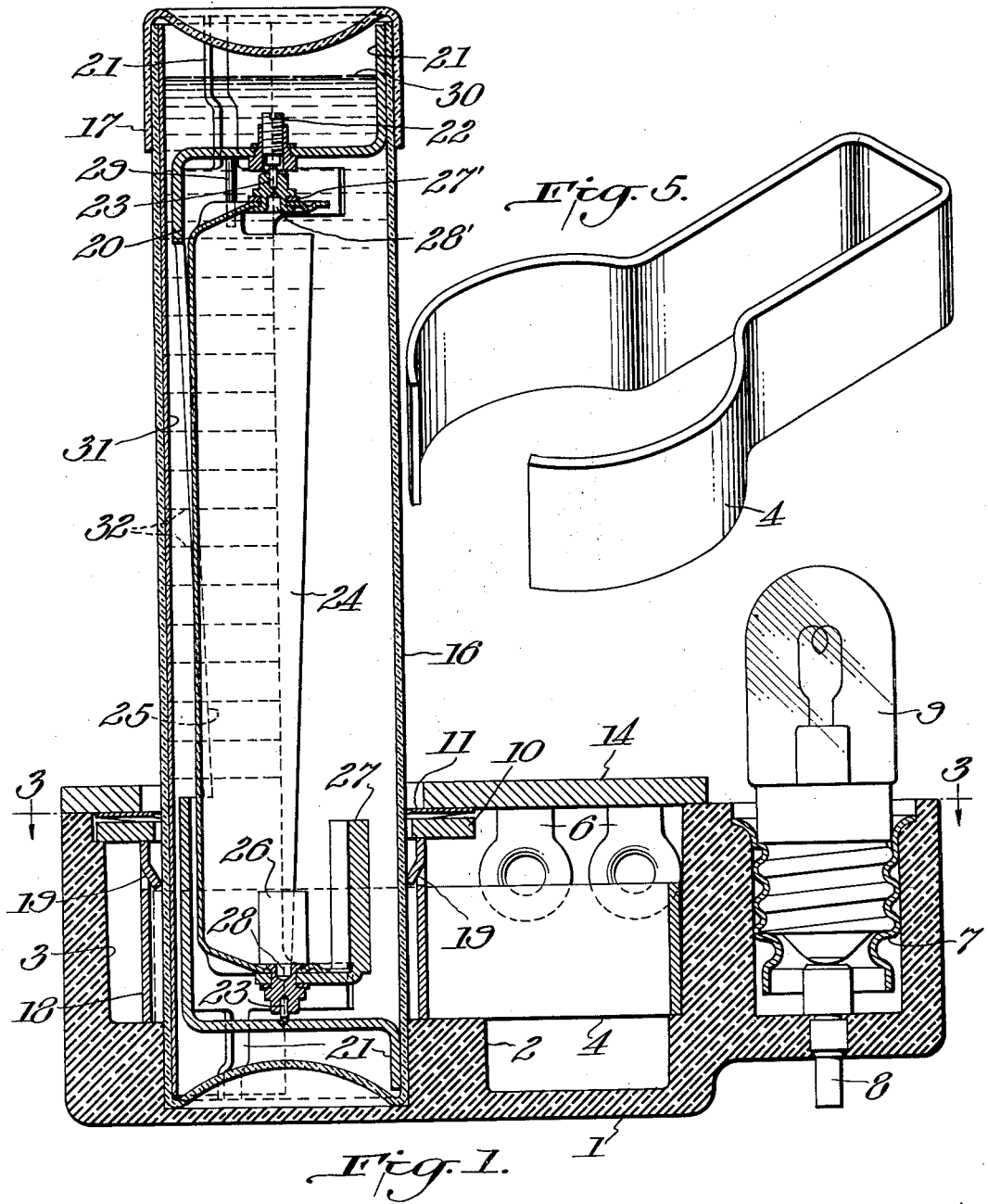

Oct. 10, 1933.    B. P. ROMAIN    1,929,715
CURRENT INDICATOR
Filed Oct. 15, 1932    3 Sheets-Sheet 2
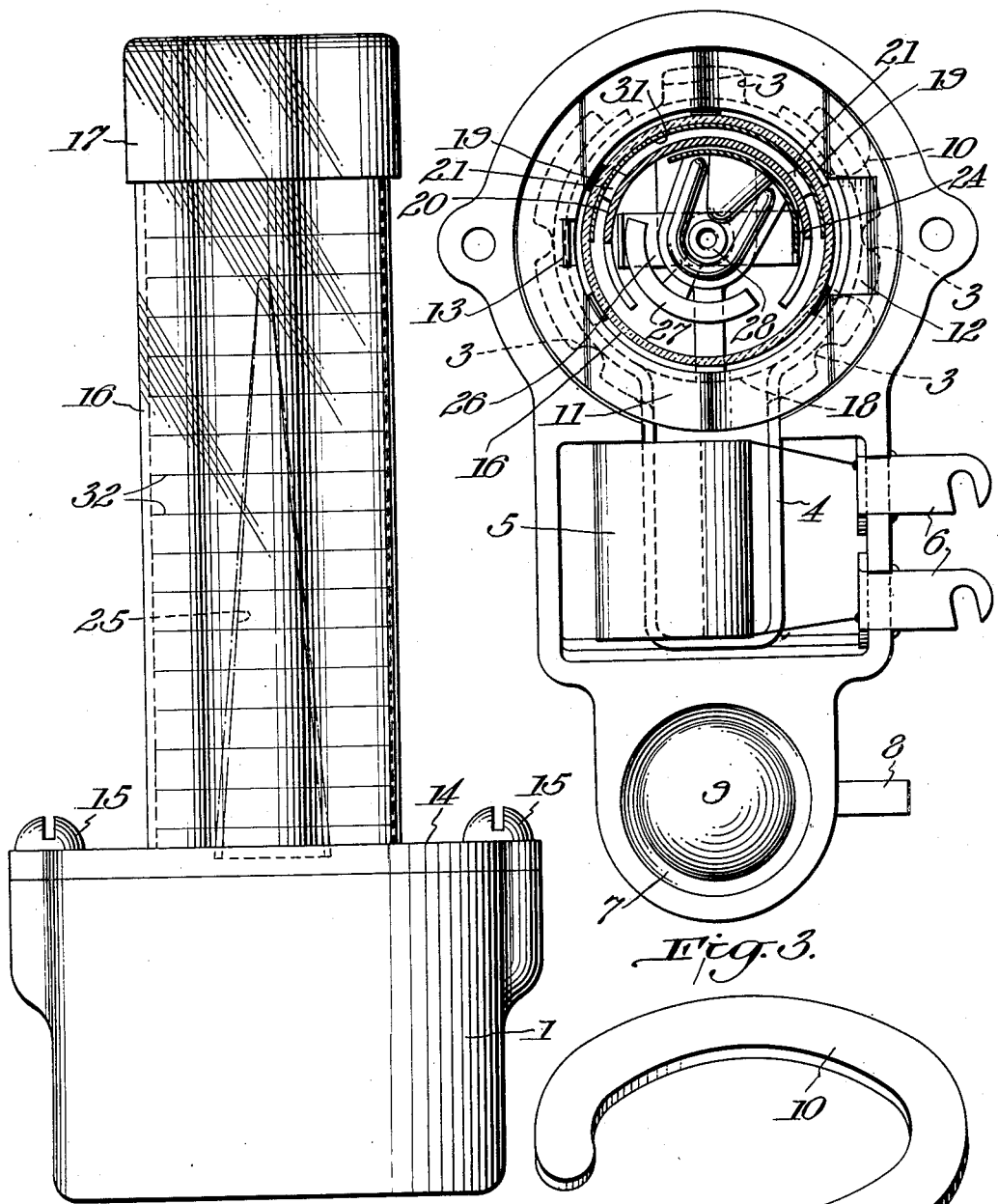
Fig.2.   Fig.3.
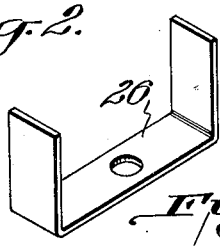
Fig.6.    Inventor:
Fig.7.    Burchard P. Romain,
By Byrnes, Townsend & Potter,
Attorneys.

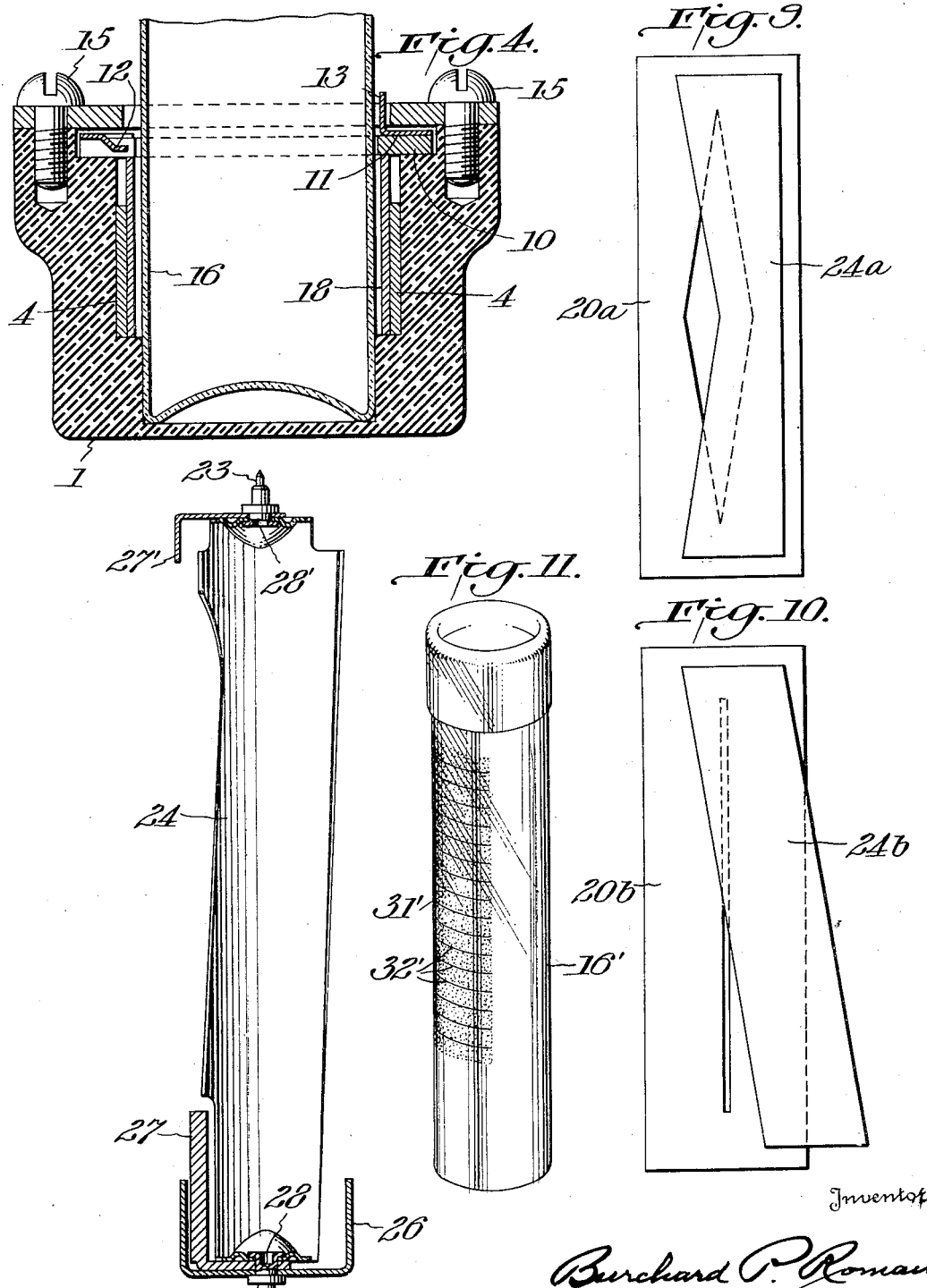

Patented Oct. 10, 1933

1,929,715

UNITED STATES PATENT OFFICE 1,929,715

CURRENT INDICATOR

Burchard P. Romain, South Orange, N. J., assignor to Weston Electrical Instrument Corporation, Newark, N. J., a corporation of New Jersey Application October 15, 1932. Serial No. 638,037

20 Claims. (Cl. 171—95)

This invention relates to current indicators and particularly to highly sensitive instruments adapted to indicate the flow of, and changes in the magnitude of, currents of the order of microamperes and milliamperes.

The invention is not limited to any particular range of sensitivity as indicators embodying the invention may be designed to draw substantial currents. For many purposes, however, it is advantageous to employ a sensitive instrument to reduce the load placed on a line by a signal instrument, and to avoid substantial changes of the electrical characteristics of the circuit in which the signal or indicator is incorporated. Current indicators such as contemplated by this invention may be shunted across a relatively low resistance in a power or other load line to indicate whether or not current is flowing in the line and/or the relative magnitude of the current. The indicators are also useful as "tuning meters" in radio receivers of the automatic gain control type, such meters or indicators being included in the plate circuit of one of the controlled amplifier stages to indicate the magnitude of the thermionic current flow in that stage.

An object of the invention is to provide a current indicator of simple, efficient and economical construction. Another object is to provide a current indicator having magnetic and movable systems which may be readily and economically assembled as separate units which may be individually tested before the assembly of the complete instrument. A further object is to provide a current indicator which may be so designed as to be extremely sensitive, but in which the moving system is effectively damped to prevent sudden and/or excessive movements of the movable system for minor fluctuations in current flow. Another object is to provide a current indicator of the type including a movable shutter for varying the size or shape of a beam of light which is thrown upon a screen, and in which the light rays from a low power source of illumination are concentrated upon the screen to give a definite and readable indication in the presence of a substantial illumination of the screen from other and inadvertent light sources. More particularly, objects of the invention are to provide current indicators including a movable system which is mounted, as a unit, in a bottle or container, and in which a liquid is preferably provided in the bottle for damping the movable system and/or for concentrating a beam of light which is controlled in size or shape by the movable element.

These and other objects and advantages of the invention will be apparent from the following specification, when taken with the accompanying drawings, in which, Fig. 1 is a central vertical section through one embodiment of the invention, Fig. 2 is a front elevation, Fig. 3 is a horizontal section on line 3—3 of Fig. 1, Fig. 4 is a fragmentary vertical section taken at right angles to that of Fig. 1, Figs. 5, 6 and 7 are perspective views of, respectively, the core of the electromagnet, and the armature, Fig. 8 is an axial sectional elevation of the moving system or shutter assembly, Figs. 9 and 10 are diagrammatic views illustrating other designs of the screen and shutter, and Figure 11 is a perspective view of another form of bottle and indicating screen.

In the drawings, the reference numeral 1 identifies a casing of approximately keyhole shape in plan and preferably formed of a molded insulating combination, having a bottom wall and side walls which are provided with internal ribs 2, 3, respectively, for receiving and accurately positioning a magnetic core 4 in the form of a metal strip bent to key-hole shape. A field winding 5 is disposed on one leg of the core and its terminals are connected to soldering lugs 6 which are mounted on the casing. A miniature lamp socket 7 is mounted in a rear extension of the casing 1 and has terminals 8, 8 for connection to a source of current appropriate for the lighting of a lamp 9. The core 4 frictionally engages the ribs 3 of the side wall of the casing to retain the electromagnet within the casing 1, and the gap at the forward end of the core is determined by the engagement of the ends of the core legs with the outer faces of the two forward ribs 3. The upper surfaces of the ribs 3 are spaced below the upper edge of the side walls to form a seat for a control magnet 10, in the form of an incomplete annulus, which may be angularly adjusted on its seat by a non-magnetic ring 11 having a downwardly projecting lug 12 seated in the gap of the magnet and a finger 13 which projects above the non-magnetic cover plate 14 that is secured to the casing 1 by screws 15. The adjusting ring is of resilient material such as sheet brass and has its opposite sides bent out of the plane of the ring to form, in effect, a spring washer which engages the cover 14 and annulus 10 to hold the latter on its seat.

The scale and moving system of the indicator is mounted, as a unit, in a transparent bottle 16, preferably of celluloid, which is sealed by cementing a cap 17 to the bottle, and which is retained within the casing by a non-magnetic bushing 18 that has a snug fit within the circular portion of the core 4 and is provided with inwardly bent fingers or lugs 19 for engagement with the bottle 16. The bushing 18 is pressed against the upper surfaces of the lugs 3 of the bottom wall by the control magnet 10, and the fingers 19 on the bushing prevent upward movement of the bottle 16.

A supporting and shield element 20 of semi-circular form is frictionally retained in the bottle 16 by outwardly bent projections 21 which extend above and below the main body of the support element 20. The upper horizontal wall of the supporting member carries an adjustable bearing 22 and the lower horizontal wall has a depression for receiving the pivot pins 23 of the movable element or shutter 24. When, as illustrated, the supporting member 20 has a triangular shaped opening 25, the shutter element 24 comprises a strip, preferably of aluminum, having side edges which make the same angle to the axis of the bottle 16 as does one side edge of the opening 25. A U-shaped armature 26 and a counterweight 27 are secured to the lower flange of the strip 24 by the rivet 28 which carries the lower pivot 23. The counterweight 27 is relatively heavy and provides an approximate balance for the shutter 24, and a closer balancing is obtained by a lighter counterweight 27' that is attached to the shutter by the upper rivet or pivot pin support 23'. Stop pins 29 project downwardly from the upper bearing support to restrict the range of angular movement of the shutter 24.

The bottle 16 is preferably filled, in whole or in part, with a liquid 30 which serves to damp the moving system to prevent continuous or excessive movement of the movable system in response to momentary changes in the magnitude of the current flow through the field winding 5.

As noted above, a lamp 9 is arranged to illuminate the rear face of the bottle 16, and the relative size or height of the triangular opening 25 through which the light beam passes is determined by the current flow through winding 5 of the electromagnet. When a transparent liquid is within a cylindrical bottle it serves as a lens for concentrating the light rays which fall upon the rear section of the bottle approximately at the center of the front wall of the bottle. To an observer positioned directly in front of the bottle 16, the portion of the opening 25 which is not obstructed by the movable strip 24 may be readily observed but, for an observer positioned laterally of the bottle, the illuminated area will be observed only when the front wall of the bottle or an element adjacent thereto acts as a secondary source of illumination. This effect may be obtained by frosting the front wall of the bottle 16, but the entire bottle is preferably transparent, though it may be and preferably is colored, and the secondary source of light is provided by a translucent or frosted strip 31 of celluloid or the like which is positioned adjacent, and preferably within, the front wall of the bottle 16. To facilitate an interpretation of the reading corresponding to a current flow through the winding 5, the translucent strip 31 may be provided with horizontal cross lines 32 which are uniformly spaced on the strip 31.

With no current flow, the armature 26 will take a position parallel to the chord drawn between the spaced poles of the annular control magnet 10, and this is angularly adjusted to secure the desired angular relationship between the shutter 24 and the opening 25 of the supporting structure 20 when no current flows through the winding 5. The parts may be so arranged that the light opening is completely obstructed for zero current and is progressively opened by an increasing current flow, or the arrangement may be such that the strip 24 is normally positioned to clear the opening 25 in the screen 20. When used as a tuning meter, the normally open arrangement is preferably used, and the electrical system is so designed that the light opening will be completely closed for a current flow corresponding to maximum amplification of the tube with which the indicator is associated. By the use of appropriate shunt resistances, instruments designed for a maximum current flow of, for example, 10 milliamperes, may be used with amplifier tubes of different types and which have different maximum plate current ratings. When tuning a receiver to resonance at a given frequency, the knob or dial in the receiver is adjusted to make the height of the illuminated triangle a maximum, as this condition corresponds to minimum plate current flow and minimum amplification.

The triangular shaped opening 25 is not essential, as the opening or openings in the shield member 20 and the shape of the shutter 24 may be varied in many ways to produce significant changes, with angular movement of the shutter 24, in the shape, size and/or location of the illuminated area or areas. The form of screen 20ª and shutter 24ª which is shown in Fig. 9 will provide an illuminated area of diamond shape which varies in size with changes in current flow, and the screen 20ᵇ and 24ᵇ of Fig. 10 are designed to provide an illuminated line which varies in height with current flow. These several designs are illustrative of the wide latitude in the design of the screen opening and the shutter form.

As shown in Fig. 11, the front of a transparent bottle 16' may be frosted, as indicated at 31', and provided with indicating lines 32'. The damping liquid, the bottle or the indicator strip may be colored if desired to increase the visibility of the current indication.

So far as I am aware, it is new to provide a moving and indicating system enclosed in a bottle. Advantages of this construction are the unitary construction which permits an assembly and testing of the moving system, as a unit, before it is assembled on the instrument casing, the possibility of damping a sensitive movement by introducing a neutral liquid, of appropriately chosen viscosity, into the bottle, and, in the case of an illuminated instrument such as herein illustrated, the possibility of increasing the brilliancy of the significant indicator by using a transparent liquid in the cylindrical bottle.

While one feature of the invention comprises the mounting of the moving system in a "bottle", it is to be understood that this term is not restricted to the illustrated form of a cylindrical bottle formed entirely of a transparent or translucent material.

The invention is not, of course, limited to the particular embodiment herein illustrated and described as many changes may be made in the several parts, their relative size, shape and relationship without departure from the spirit of my invention as set forth in the following claims.

I claim:

1. A current indicator of the type including an electromagnetic field system, and a moving system comprising an armature and an indicating element for cooperation with a scale, characterized by the fact that said moving system is mounted in a bottle and is a unit structurally independent of said field system.

2. The invention as claimed in claim 1, in combination with a liquid in said bottle for damping said moving system.

3. In a current indicator, the combination with a casing and an electromagnet therein, of a container secured to said casing, an armature pivotally supported in said container, an indicator element in said container and carried by said armature, a portion of the wall of said container being transparent to permit observation of the movement of said indicator element.

4. A current indicator comprising a casing, a magnetic system in said casing and comprising a core having a winding thereon, and a moving and scale system carried by a translucent bottle mounted on said casing.

5. In a current indicator, the combination with a support, a core and a field winding carried thereby, of an armature pivotally mounted for cooperation with said core, a translucent bottle carried by said support and housing said armature, and an indicating element connected to said armature.

6. In a current indicator, the combination with a magnetic system including a core having a winding thereon, of a moving system, a bottle housing said moving system, and liquid in said bottle for damping said movable system.

7. In a current indicator, a casing, a field winding and a magnetic core having spaced legs terminating in opposed pole pieces, a cylindrical bottle mounted between said legs, an armature pivotally supported in and for angular movement about the axis of said bottle, an indicator element connected to said armature, said indicator being within said bottle and movable along one side thereof, liquid in the portion of the bottle occupied by said indicator element, and a light source outside of said bottle and diametrically opposite the side thereof along which the indicator element moves.

8. In a current indicator, a movable system comprising a bottle, a support member frictionally retained within said bottle, said support member having an opening therethrough, a shutter member pivotally mounted on said support member and adapted to be moved in response to current flow to obstruct said opening in said support.

9. The invention as set forth in claim 8, wherein said bottle is provided with a translucent wall member serving as a secondary light source, and a source of light for illuminating said translucent wall member.

10. In a current indicator, a casing, a field winding and a magnetic core in said casing, a bottle seated in said casing and extending above the top surface thereof, supporting means in said bottle, an armature in said bottle and adjacent said core, an indicator element secured to said armature, and means pivotally mounting said armature and indicator means on said supporting means.

11. The invention as set forth in claim 10, in combination with a source of light, said supporting means comprising a shield member having an opening therethrough, and said indicating element comprising a shutter movable adjacent said opening in response to current flow in said field winding to control the passage of light rays from said source through said opening.

12. In a current indicator, the combination with a magnetic system, an armature cooperating with said moving system and mounted for angular movement with respect thereto, a fixed shield element having an opening therein, a shutter element connected to and movable with said armature, a translucent scale element, and a source of light adapted to illuminate said scale element when said shutter element obstructs less than the entire opening of said shutter element, of a cylindrical bottle having liquid therein for concentrating upon said scale element light rays from said source.

13. The invention as set forth in claim 12, wherein said translucent scale element comprises a portion of the wall of said cylindrical bottle.

14. The invention as set forth in claim 12, wherein said scale element is located within said bottle and adjacent a portion of the cylindrical wall thereof diametrically opposite said source of light.

15. In a current indicator, a casing having bottom and side wall surfaces for receiving a core, a core and a field winding thereon within said casing, said core comprising a strip having opposed legs shaped to approximately keyhole shape, a control magnet mounted on said casing for angular movement with respect to said core, a bottle having one end thereof mounted within said casing and between the legs of said core, an armature and an indicating element pivotally mounted within said bottle, a closure for said casing, and means having a portion extending to the exterior of said casing for adjusting said control magnet, thereby to adjust the zero position of said indicating element.

16. In an electrical instrument of the type stated, a casing of approximately keyhole shape in plan, ribs on the side and bottom walls of said casing, a core of keyhole shape positioned by said ribs, a field winding on said core, a control magnet of open annular form mounted on the side walls of said casing, a spring washer on said magnet and having a lug depending into the gap of said magnet and an upstanding finger, a cover for said casing having an opening therein, a bottle having its lower end passing into said casing through said opening, a bushing retained within said casing by said cover and having lugs engaging said bottle to retain the lower end thereof within the casing, and a moving system and scale carried by said bottle.

17. The invention as set forth in claim 16, in combination with a socket carried by said casing for receiving a lamp, and wherein said moving system includes an armature and a shutter element pivotally supported on said bottle for angular movement between said socket and said scale.

18. In a current indicating instrument, a casing, a core with opposed legs supported by said casing, a field winding on said core, a bushing within the opposed legs of said core, a cylindrical bottle retained between said core legs by said bushing, a shield support within said bottle, a scale at one side of said bottle, a lamp on said casing at the side thereof opposite said scale, an armature pivotally mounted within said bottle, and an indicating element carried by said armature and movable between said socket and said scale.

19. The invention as set forth in claim 18, wherein said scale comprises a translucent member adjacent one wall of said cylindrical bottle, and said shield support has an opening therein adjacent said scale.

20. In a current indicator, the combination with a field winding, a magnet, a pivoted armature and indicator element carried thereby, and a translucent scale element adjacent the path of movement of the indicator element, of a transparent bottle within which said armature is pivotally supported, a source of light at the side of said bottle diametrically opposed to said scale element, and a transparent liquid within said bottle for damping the movement of said armature and for concentrating light from said source upon said scale element.

BURCHARD P. ROMAIN.